(12) United States Patent
Piesing

(10) Patent No.: US 7,748,015 B2
(45) Date of Patent: Jun. 29, 2010

(54) PROCESSING OF A BROADCAST SIGNAL

(75) Inventor: Jonathan R. Piesing, Croydon (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 2422 days.

(21) Appl. No.: 10/241,083

(22) Filed: Sep. 11, 2002

(65) Prior Publication Data
US 2003/0079225 A1 Apr. 24, 2003

(30) Foreign Application Priority Data
Sep. 20, 2001 (GB) ................................ 0122669.5

(51) Int. Cl.
H04N 7/10 (2006.01)

(52) U.S. Cl. ........................... 725/32; 725/136; 725/139

(58) Field of Classification Search .................. 725/32, 725/136, 139
See application file for complete search history.

(56) References Cited

U.S. PATENT DOCUMENTS

| 4,695,879 A | * | 9/1987 | Weinblatt ..................... 725/10 |
| 4,890,168 A | * | 12/1989 | Inoue et al. .................... 386/69 |
| 5,274,706 A | * | 12/1993 | Sugiyama .................. 380/241 |
| 5,448,568 A | | 9/1995 | Delpuch et al. ............. 372/94.2 |
| 5,818,438 A | * | 10/1998 | Howe et al. .................. 715/718 |
| 5,872,588 A | * | 2/1999 | Aras et al. ..................... 725/14 |
| 6,148,081 A | | 11/2000 | Szymanski et al. ............ 380/33 |
| 6,493,878 B1 | * | 12/2002 | Kassatly ...................... 725/144 |
| 6,530,082 B1 | * | 3/2003 | Del Sesto et al. ............... 725/9 |
| 6,571,392 B1 | * | 5/2003 | Zigmond et al. ............ 725/110 |
| 7,051,360 B1 | * | 5/2006 | Ellis et al. .................... 725/136 |
| 2002/0040482 A1 | * | 4/2002 | Sextro et al. ................. 725/136 |
| 2002/0059644 A1 | * | 5/2002 | Andrade et al. ............. 725/136 |
| 2005/0015796 A1 | * | 1/2005 | Bruckner et al. .............. 725/32 |
| 2006/0195510 A1 | * | 8/2006 | McNally ..................... 709/203 |

FOREIGN PATENT DOCUMENTS

| WO | WO 00/78043 | * 12/2000 |
| WO | WO0078033 | 12/2000 |
| WO | WO0078043 | 12/2000 |
| WO | WO0078043 A1 | * 12/2000 |

* cited by examiner

Primary Examiner—Brian T Pendleton
Assistant Examiner—Nnenna N Ekpo

(57) ABSTRACT

A method of processing a broadcast signal comprises receiving a broadcast signal, the signal including a video component and an audio component. A data component including an interactive application is also received which may be part of the broadcast signal. The broadcast signal is monitored for an identification signal, and the operation of the interactive application is interrupted if the identification signal is not present.

22 Claims, 1 Drawing Sheet

PROCESSING OF A BROADCAST SIGNAL

Figure 1:
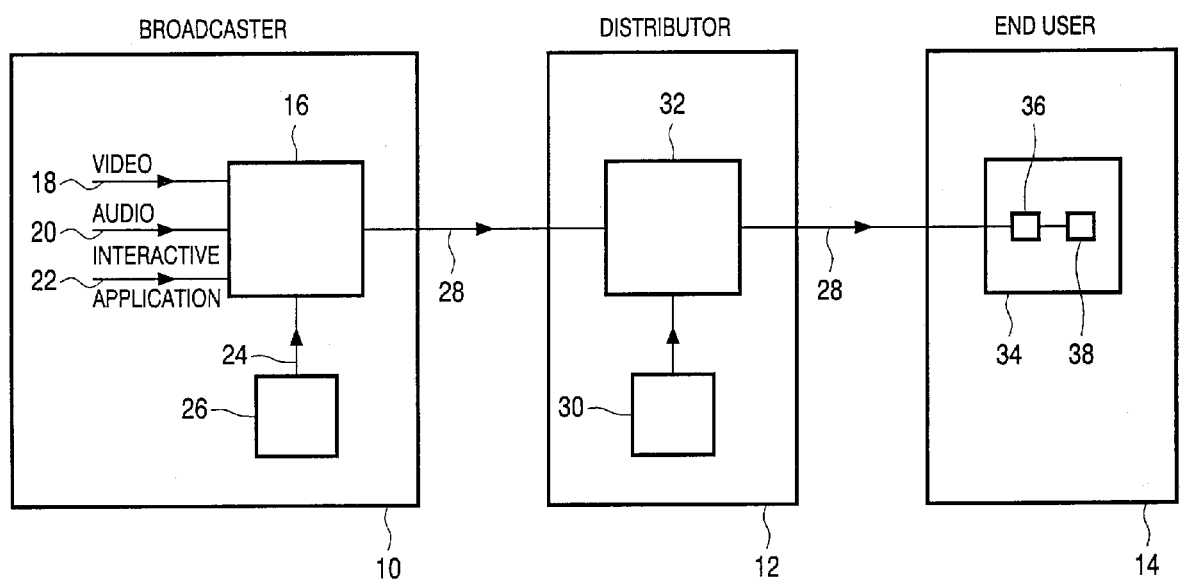

This invention relates to a method of and apparatus for processing a broadcast signal, to a method of generating such a signal and to the broadcast signal itself.

WO 00/78043 A1 describes automatic control of broadcast and execution of interactive applications to maintain synchronous operation with broadcast programs. It discloses that an automation server interfaces with broadcast scheduling systems of various types to automatically synchronize interactive applications relative to broadcast programs, such as television shows and commercials, so as to maintain the appropriate interactive application, with respect to the current broadcast program.

However this International Patent Application Publication does not address the problem of synchronization of broadcast programs with their respective interactive applications when the broadcast signal passes through one or more television broadcasters/network operators, following the original broadcaster. If the broadcast signal passes through another broadcaster or operator who adds further material to the signal, typically commercials, then the original synchronization is lost.

In normal television, commercials can be inserted at any point in time during a program. The original producer or editor of the program will often prepare specific points where commercials are intended to be inserted but the insertion of commercials at other points is not prevented and is in fact quite common except when a program is first shown by its originator. When interactive applications are added to programs, this is normally carried out largely disconnected from the production of the video and audio components. The distribution of an interactive application through the broadcast network to the end user is frequently achieved using equipment that is unaware of the nature of the interactive application, or sometimes even the existence of such an application.

When a broadcaster interrupts a program to insert commercials, any interactive application running at that time may not be aware that the program has been interrupted and that the video and audio components which the end user is viewing are the video and audio components of the commercial and not that of the original program. This can result in the interactive application continuing to run, showing, for example, graphics on the screen that are irrelevant to the commercial or that obscure the commercial. If the inserted commercial has its own interactive application, then there will be the obvious problems associated with two applications attempting to run at the same time.

Currently, either program with interactive applications must be restricted to only have commercials inserted at pre-defined positions or the equipment inserting the commercials must be aware of the interactive application and take some action when switching between the main program and the commercial. The first solution leads to a significant loss of operational freedom for the broadcaster. The second is only possible if there is a close relationship between the organization from which the program originated and the organization inserting the commercials, and even so requires a significant investment in the modification of the advert insertion equipment.

It is therefore an object of the invention to provide an improvement of the known systems and apparatus.

According to a first aspect of the invention, there is provided a method of processing a broadcast signal, comprising receiving a broadcast signal, said signal comprising a video component and an audio component, receiving a data component comprising an interactive application, monitoring said broadcast signal for an identification signal, and interrupting the operation of the interactive application if said identification signal is not present.

According to a second aspect of the invention, there is provided apparatus for processing a broadcast signal, comprising receiving means for receiving a broadcast signal, said signal comprising a video component and an audio component, and for receiving a data component comprising an interactive application, and monitoring means for monitoring said broadcast signal for an identification signal, and for interrupting the operation of the interactive application if said identification signal is not present.

The data component may be a portion of the broadcast signal or may be received from a local storage medium. The monitoring of the broadcast signal can be carried out by the interactive application. The interrupting may comprise the suspension of the interactive application. The broadcast signal can be either a digital or an analogue television signal. If the broadcast signal is an analogue signal then the identification signal can be present in the vertical blanking interval of said broadcast signal.

According to a third aspect of the invention, there is provided a method of generating a broadcast signal, comprising multiplexing a video component, an audio component and an identification signal to create a broadcast signal.

Preferably, the method further comprises multiplexing into the broadcast signal a data component comprising an interactive application. Advantageously, the method may also further comprise transmitting the broadcast signal to a television distribution network. The method can further comprise the insertion of commercials into the broadcast signal.

According to a fourth aspect of the invention, there is provided a broadcast signal comprising a video component, an audio component and an identification signal.

In addition, the signal can further comprise a data component comprising an interactive application.

Owing to the invention, it is possible to provide an efficient system for the handling of a broadcast signal that allows the insertion of commercials into the signal without interfering with any interactive application present in the signal. This is achieved by the use of an identification signal that is added when the broadcast signal is generated. The broadcast signal is then monitored for the presence of this identification signal, when the signal is processed at the receiving end.

Embodiments of the invention will now be described, by way of example only, with reference to the accompanying drawing in which:

FIG. 1 is a schematic diagram of a system for the generating, broadcast and receipt of a broadcast signal.

In the FIGURE, the actions of the broadcaster, distributor and end user are shown respectively at 10, 12 and 14. Only one distributor 12 is illustrated, but in many applications there will be other distributors and/or network operators in the distribution chain.

In this embodiment, the originator of the broadcast signal is provided with a multiplexer 16. This multiplexes a video component 18, an audio component 20 and a data component 22 with an identification signal 24 produced by a device 26 to generate a broadcast signal 28. The data component 22 is in the form of an interactive application.

The interactive application typically relates to the material being broadcast. For example, if the broadcast material is a golf tournament then the interactive application may contain statistical information on the golfers participating, a hole by hole map of the course, an interactive leaderboard etc. The end user 14 can access these functions as desired through a suitable user interface. In the system of FIG. 1, the interactive application that is transmitted to the end user 14 is part of the data component that is a portion of the broadcast signal 28. The interactive application can alternatively be received from a local storage medium or can be retrieved by the end user's receiver 34 via a wired connection to a remote store.

The device 26 produces an identification signal 24 at a regular interval in the form of a "heartbeat" that is carried in the video/audio distribution channel of the signal 28. This identification signal 24 is synchronised with the interactive application, or with the time sections of the broadcast signal 28 that will have a corresponding interactive application, if the application is transported to the end user's receiver 34 via a different route.

The broadcast signal 28 is transmitted to the distributor 12 who is free to break this signal 28 up as desired by the addition of further broadcast material. In most cases this extra material is retrieved from a database 30 that contains commercials (and potentially interactive applications associated with those commercials) that are spliced into the signal 28 by an insertion device 32. This now-modified signal 28 comprises the original broadcast signal with the video, audio and data components 18, 20 and 22, and an identification signal 24, broken up by commercials, that do not have any corresponding identification signal.

The signal 28 is broadcast to the end user's receiver 34, which in this embodiment is a digital television receiver in the form of a set top box. The receiver is arranged to display on its associated display device (not shown), usually an analogue television, the broadcast video component and play the broadcast audio component of the channel selected by the user 14. The user 14 can access the interactive application, as desired, from a suitable remote control device. In most cases, the interactive application is shown on the display device superimposed upon the video component of the broadcast, with the user 14 able to make selections to navigate the interactive application.

The receiver 34 is provided with receiving means 36 for receiving the broadcast signal 28 and for receiving the data component comprising the interactive application if this is transported by a different method. The receiver also includes monitoring means 38 for monitoring the broadcast signal 28 for the presence of the identification signal 24 and for interrupting the operation of the interactive application if the identification signal 24 is not present.

Therefore in those sections of the broadcast signal 28 that have been added by the distributor 12 and do not have an identification signal, the monitoring means will note the absence of the identification signal 24 and interrupt the running of the interactive application. In its simplest execution this interruption will be the suspension of the interactive application pending the return of the identification signal 24. However other interruptions are possible, including miniaturization of the interactive application on the display, or pausing the application so it is still visible but not operational, removing of the graphical elements from the display, or pausing an internal timebase.

The receiving means 36 and monitoring means 38 as shown in FIG. 1 are discrete components within the receiver 34, but they could alternatively be formed as portions of an integrated circuit. Equally the operations of these functional elements of the receiver 34 could be achieved by computer program elements of the software controlling the receiver 34.

The monitoring of the broadcast signal 28 can be carried out by the interactive application itself, thereby achieving a measure of self-reference. In this embodiment, the interactive application, which is normally a collection of Java applets and executable files, has the added functionality that it can monitor for the presence of the identification signal 24. If the application becomes aware that the identification signal is not present in the broadcast signal 28 then it interrupts its own operation, until the identification signal is resumed.

Typically the "heartbeat" of the identification signal 24 occurs as a periodic pulse in the signal 28 and the monitoring of the identification signal allows a time delay of, for example, twice the frequency of the pulse before interrupting the operation of the interactive application. The identification signal 24 has a period of half a second, although any suitable short period of time is acceptable.

The embodiment of FIG. 1 relates to a digital broadcast signal 28, but in an alternative embodiment the broadcast signal is an analogue signal and the identification signal is present in the vertical blanking interval (VBI) of the broadcast signal. In analogue television, the "heartbeat" signal can be carried in one of the television lines in the VBI normally used for carrying teletext data. In a more specific example, if the interactive applications are using the ATVEF (Advanced Television Enhancement Forum) technology, this would rely on the carriage of multicast IP in those VBI lines and the "heartbeat" would take the form of a UDP packet sent on a dedicated multicast IP address.

The invention claimed is:

1. A method of processing a broadcast signal, the method comprising acts of:
   receiving by an end user device a broadcast signal, said signal comprising a video component and an audio component,
   receiving by the end user device a data component comprising an interactive application,
   monitoring by the end user device said broadcast signal for an identification signal, and
   interrupting by the end user device the operation of the received interactive application if said identification signal is not periodically present, wherein the act of interrupting the operation of the interactive application comprises an act of delaying interrupting the operation of the interactive application for at least twice the expected frequency of occurrence of the identification signal.

2. The method according to claim 1, wherein said data component is received by the end user device as a portion of said broadcast signal.

3. The method according to claim 1, wherein said data component is received by the end user device from a local storage medium.

4. The method according to claim 1, wherein said monitoring of the broadcast signal is carried out by said interactive application.

5. The method according to claim 1, wherein said interrupting comprises the suspension by the end user device of said interactive application.

6. The method according to claim 1, wherein said broadcast signal is an analogue signal and said identification signal is present in a vertical blanking interval of said broadcast signal.

7. An apparatus for processing a broadcast signal, the apparatus comprising receiving means for receiving a broadcast signal, said signal comprising a video component and an audio component, and for receiving a data component comprising an interactive application, and monitoring means for monitoring said broadcast signal for an identification signal, and for interrupting the operation of the received interactive application if said identification signal is not periodically present, wherein the monitoring means delays interrupting the operation of the interactive application for at least twice the expected frequency of occurrence of the identification signal.

8. The apparatus according to claim 7, and further comprising a local storage medium for storing said data component.

9. The apparatus according to claim 7, wherein said interactive application is executed by said monitoring means.

10. The apparatus according to claim 7, wherein said receiving means and said monitoring means are portions of an integrated circuit.

11. A method of generating a broadcast signal, the method comprising acts of multiplexing by a broadcaster device a video component, an audio component, a data component comprising an interactive application, an identification signal and content not related to any of the video, audio, or data components to create the broadcast signal; periodically providing by the broadcaster device the identification signal corresponding to periodic portions of the video and audio components, wherein periodically provided broadcast signal is arranged to enable rendering of the received data component during rendering of the video and audio components; and interrupting the rendering of the data component if the identification signal is not periodically present, wherein the act of interrupting the rendering of the data component is delayed for at least twice the expected frequency of occurrence of the identification signal.

12. The method according to claim 11, and further comprising an act of transmitting said broadcast signal to a television distribution network.

13. The method according to claim 12, wherein said content are commercials inserted into said broadcast signal at the television distribution network.

14. The method according to claim 1, wherein the act of interrupting comprises an act of miniaturizing by the end user device a rendering of the interactive program while the operation of the interactive application is interrupted.

15. The method according to claim 1, wherein the act of interrupting comprises an act of pausing by the end user device a timebase on which continued processing of the interactive application depends.

16. A computer executable program stored on a non-transitory computer readable medium, the program arranged to process a broadcast signal, the program comprising a portion arranged to control receipt of a broadcast signal, the signal comprising a video component and an audio component; a portion arranged to receive a data component comprising an interactive application; a portion arranged to monitor the broadcast signal for an identification signal; and a portion arranged to interrupt the operation of the received interactive application if said identification signal is not periodically present, wherein the portion arranged to interrupt the operation of the interactive application if said identification signal is not periodically present is arranged to delay interrupting the operation of the interactive application for at least twice the expected frequency of occurrence of the identification signal.

17. The program according to claim 16, wherein the portion arranged to interrupt is arranged to miniaturize a rendering of the interactive program while the operation of the interactive application is interrupted.

18. The program according to claim 16, wherein the portion arranged to interrupt is arranged to pause a timebase on which continued processing of the interactive application depends.

19. The method according to claim 1, wherein said identification signal is a periodic signal that is received by the end user device at regular intervals.

20. The apparatus according to claim 7, wherein said identification signal is a periodic signal that is received by the end user device at regular intervals.

21. The method according to claim 11, wherein the act of periodically providing said identification signal comprises an act of periodically providing by the broadcaster device a periodic signal that occurs at regular intervals.

22. The program according to claim 16, wherein said identification signal is a periodic signal that occurs at regular intervals.

* * * * *